(12) United States Patent
Graves et al.

(10) Patent No.: US 6,407,798 B2
(45) Date of Patent: *Jun. 18, 2002

(54) DUAL-SCREEN THEATER

(75) Inventors: Jeffrey P. Graves, Mill Creek, WA (US); William Neil Grant, Surrey (GB); Kevin P. Johnson; Joe M. Pacitti, both of Portland, OR (US)

(73) Assignee: Entertaiment Properties, Inc., Bellevue, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/404,445

(22) Filed: Sep. 22, 1999

(51) Int. Cl.[7] .......................... G03B 37/00; G03B 21/56
(52) U.S. Cl. .................. 352/69; 359/443; 359/449; 359/451
(58) Field of Search .............................. 352/40, 69, 70, 352/88, 244, 44, 48; 359/443, 444, 445, 446, 447, 449, 450, 451, 459; D16/205; 472/59, 60, 61, 75, 77, 78, 79, 80, 81

(56) References Cited

U.S. PATENT DOCUMENTS

| | | | | |
|---|---|---|---|---|
| 1,802,570 A | * | 4/1931 | Ogletree | 353/10 |
| 1,896,652 A | * | 2/1933 | Vitolo | 52/6 |
| 2,528,311 A | * | 10/1950 | Hurley | 434/420 |
| 2,699,090 A | * | 1/1955 | Underhill | 359/444 |
| 2,900,870 A | * | 8/1959 | Jackson | 359/451 |
| 2,942,517 A | * | 6/1960 | Moon et al. | 359/451 |
| 3,035,836 A | * | 5/1962 | McCulley | 472/61 |
| 3,469,837 A | * | 9/1969 | Heilig | 472/60 |
| 3,659,355 A | * | 5/1972 | Aubin | 434/408 |
| 4,569,076 A | * | 2/1986 | Holman | 381/82 |
| 4,705,355 A | * | 11/1987 | Espo | 359/443 |
| 4,962,420 A | * | 10/1990 | Judenich | 348/744 |
| 5,115,608 A | * | 5/1992 | Abraham et al. | 52/238.1 |
| 5,125,732 A | * | 6/1992 | Jacobson et al. | 352/11 |
| 5,329,323 A | * | 7/1994 | Biles | 353/10 |
| 5,765,314 A | * | 6/1998 | Giglio et al. | 52/7 |
| 5,875,591 A | * | 3/1999 | Jines | 52/66 |
| 5,964,064 A | * | 10/1999 | Goddard et al. | 52/8 |
| 6,085,861 A | * | 7/2000 | Jines | 181/30 |

FOREIGN PATENT DOCUMENTS

| | | | |
|---|---|---|---|
| CH | 453742 | * | 6/1968 |
| DE | 1 220 731 | | 7/1965 |
| DE | 26 45 141 A1 | | 4/1978 |
| FR | 1448913 | * | 7/1966 |
| SU | 118138 | * | 1/1958 |
| SU | 122627 | * | 9/1958 |

* cited by examiner

Primary Examiner—Russell Adams
Assistant Examiner—Rodney Fuller
(74) Attorney, Agent, or Firm—Michael J. Donohue; Seed IP Law Group PLLC

(57) ABSTRACT

An embodiment of the invention provides a theater having a first screen and a second screen movable relative to the first screen. The first and second screens are typically designed for different movie formats. The second screen is mounted to a frame in sections, and a rotating member is operable to move sections of the second screen away from the first screen. A projection system disposed in front of one of the screens is operable to project screen images alternatively on the first screen or on the second screen. A plurality of speakers are mountable to the frame to provide a sound system.

18 Claims, 5 Drawing Sheets

DUAL-SCREEN THEATER

TECHNICAL FIELD

This invention relates to movie theaters, and more particularly, to a dual-screen movie theater.

BACKGROUND OF THE INVENTION

Motion pictures shown in movie theaters are generally in 35 mm or 70 mm film formats (sometimes referred to as "first-run" movies), which have become the current standard formats in the movie industry. In order to provide high-quality screen images having minimal distortion, movie screens are designed with a width and arcuate radius suitable for these film sizes.

In the 1960s, specialized movie theaters in the United States began showing Cinerama-type motion pictures. Cinerama-type motion pictures provide wider screen images than first-run movies by using three projectors to project three separate screen images adjacently onto a wider movie screen, with the three screen images together forming a single frame or screen image for the motion picture. The three projectors are mounted in an arc which covers a very wide aggregate angle of view. A center projector projects images forward, and two projectors on either side of the center projector crisscross, with a right projector projecting an image on a left panel of the movie screen and a left projector projecting an image on a right panel of the movie screen.

Because of the unique manner in which Cinerama-type motion pictures are projected and the requirements for a wider screen, movie screens designed for first-run movies cannot be used adequately for the wider screen images of Cinerama-type motion pictures. Significant screen distortion occurs if a Cinerama-type motion picture is projected onto a movie screen having a width and arcuate radius designed for first-run movies having the 35 mm or 70 mm format. Similarly, screens designed for Cinerama-type motion pictures are not well-suited for showing 35 mm or 70 mm first-run movies. These limitations have created problems because movie theaters build and use only one screen, and so theaters often do not have the capability of showing both Cinerama-type and first-run motion pictures.

SUMMARY OF THE INVENTION

An embodiment of the invention addresses the problems described above by providing a theater comprising a first screen, a second screen movable relative to the first screen, and a projection system disposed in front of one of the screens and operable to display screen images alternatively on the first screen or on the second screen. The second screen can be positionable between the first screen and the projection system to allow the projection system to project the screen images on the second screen instead of on the first screen. As a result, by providing one screen that is movable with respect to the other screen, the theater is capable of showing two different formats of motion pictures on two types of movie screens.

In one embodiment, the second screen is mounted to a frame having a plurality of frame sections. The frame sections are attached to a corresponding rotating member operable to rotate and move a frame section relative to the first screen. In this manner, the second screen is movable away from the first screen to allow the screen images to be projected on the first screen instead of on the second screen. The second screen can be moved back to its initial position if the screen images are to be displayed on the second screen instead of on the first screen.

In another embodiment, the first screen is sized to display wide-screen screen images, such as Cinerama-type motion pictures, and the second screen is sized to display screen images having dimensions different from the wide-screen screen images, such as 35 mm or 70 mm motion pictures. In other alternative embodiments, it is the second screen that is sized to accommodate wide-screen screen images, and the first screen is sized to display screen images having dimensions different from the wide-screen screen images. Additional embodiments provide a sound system, with the sound system including a plurality of speakers mounted to a frame. In one embodiment, the frame can also provide mechanical support for the screen.

BRIEF DESCRIPTION OF THE DRAWINGS

In the following drawings, like reference numerals refer to like parts throughout the various view, unless otherwise indicated.

DETAILED DESCRIPTION OF THE ILLUSTRATED EMBODIMENTS

Figure 1:
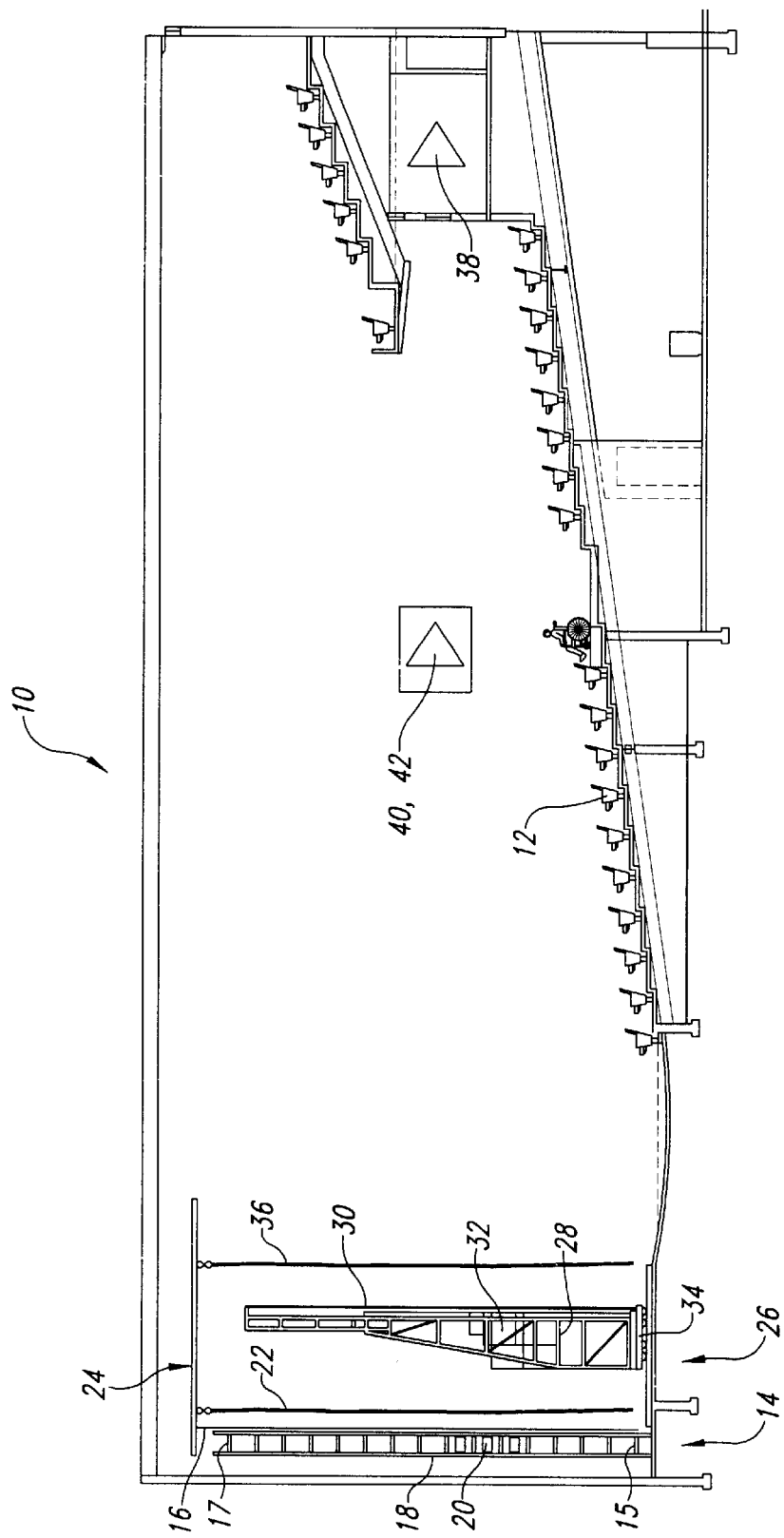
FIG. 1 is a side elevational view of a dual-screen movie theater according to an embodiment of the invention.

Referring first to FIG. 1, shown generally at 10 is a theater according to an embodiment of the invention. The theater 10 includes a plurality of rows of seats 12 for movie viewers. The theater 10 has a screen 14 for showing Cinerama-type motion pictures (hereinafter referred to as the "wide screen" 14), and a screen 26 for showing first-run motion pictures having 35 mm or 70 mm film formats (hereinafter referred to as the "first-run screen" 26). Although for clarity of illustration the wide screen 14 and first-run screen 26 are shown as flat screens in FIG. 1, a person knowledgeable in the art would understand that these two screens are actually arcuate or curved in shape (see, e.g., FIG. 2).

The wide screen 14 includes a frame 18. A screen sheeting 16 is mounted on and stretched across the frame 18 to form a curved, rectangular screen surface. The screen sheeting 16 is made of a conventional pliant material having a reflective coating and a light and opaque color. The material used for the screen sheeting 16 is conventional projector screen material and need not be described in greater detail herein except as it relates to the dual-screen operation. The screen sheeting 16 can be perforated with tiny holes (not shown) to allow sound from one or more speakers 20 positioned within the frame 18 to radiate outwardly from the wide screen 14 towards the rows of seats 12. In an exemplary embodiment, the screen sheeting 16 can also comprise a plurality of narrow strips stretched vertically from an upper strip rail 17 to a lower strip rail 15. These strips provide the flexibility to allow the surface of the wide-screen 14 to be curved easily to a desired arcuate radius. When positioned tightly or overlappingly against each other (e.g., similar to leaves of a Venetian blind), the row of strips gives the appearance of a substantially continuous and smooth screen surface. A curtain 22 is positionable in front of the wide screen 14 and is mounted to a ceiling track 24. The curtain 22 moves along the ceiling track 24 during the beginning and end of a motion picture.

The first-run screen 26 includes a frame 28 that supports a screen sheeting 30. The screen sheeting 30 can also be perforated with tiny holes and can be made of the same material as the screen sheeting 16 of the wide screen 14, such as a pliant material that is easily rolled and unrolled. Alternatively, the screen sheetings 16 and 30 can be made of a non-pliant material, so long as the resulting screen surfaces still have the requisite light color, opaqueness, and curvature. Because the first-run screen 26 is capable of showing 35 mm or 70 mm motion pictures, a screen masking (not shown) can be provided along the outer perimeter of the screen surface area. That is, the entire screen surface area of the first-run screen 26 is used as an active projection area when 70 mm motion pictures are projected. When 35 mm motion pictures are projected, the screen masking covers the peripheral edges of the first-run screen 26 outside of the active projection area.

The frame 28 of the first-run screen 26 is mounted on a platform 34 having wheels or rollers. This allows the whole structure to be easily moved. In an alternative embodiment, the frame 28 can be mounted on sliding tracks instead of rollers, thereby still providing mobility. Like the wide screen 14, the first-run screen 26 has one or more speakers 32 mounted to the frame 28. The first-run screen 26 can have its own curtain 36 mounted to the ceiling track 24. In an alternative embodiment, a single curtain can be used for both the wide screen 14 and the first-run screen 26, as will be described later below.

The theater 10 has a central projector 38 that projects screen images of 35 mm or 70 mm motion pictures on the first-run screen 26. When the theater 10 is showing Cinerama-type motion pictures, the first-run screen 26 is moved, as will be described below, and the central projector 38 forms the central projector, with side projectors 40 and 42 forming second and third criss-crossing projectors to project the screen images on the wide screen 14.

Figure 2:
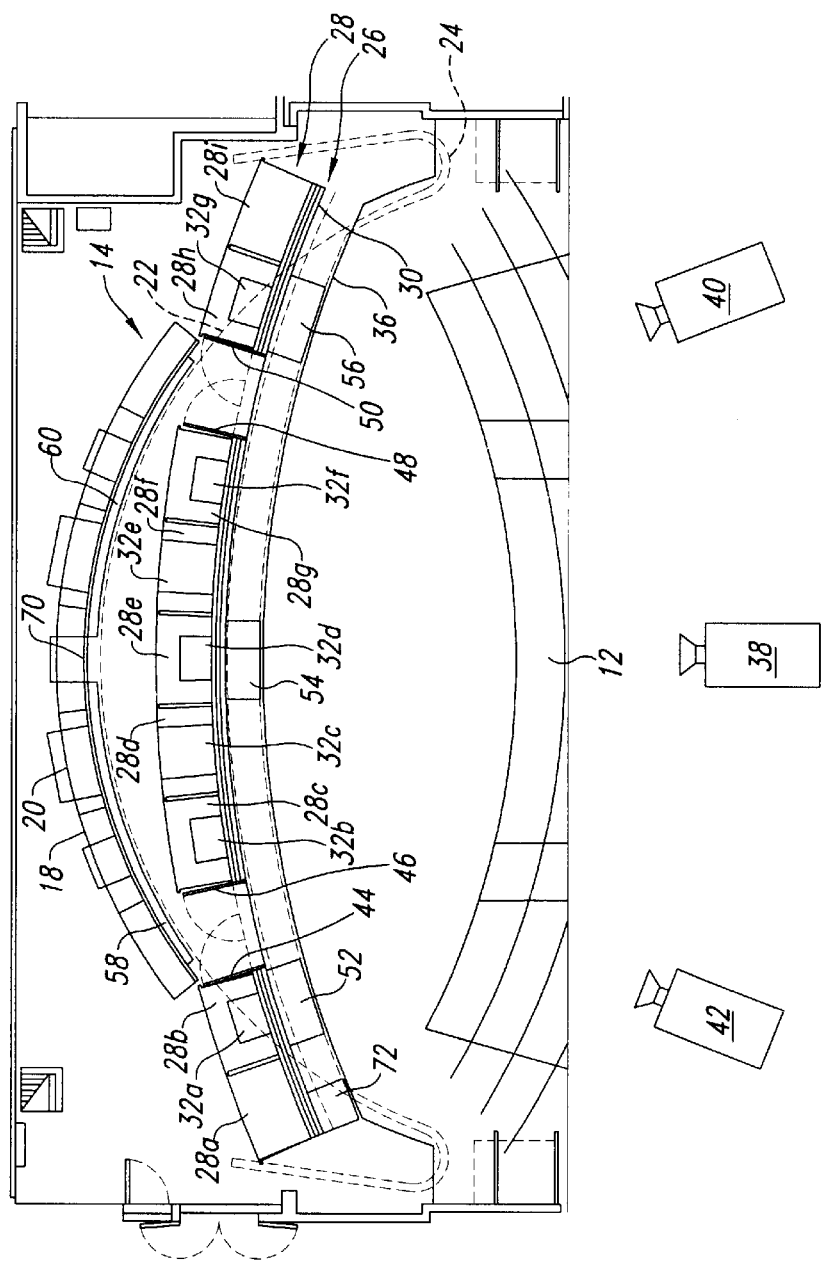
FIG. 2 is a top plan view showing embodiments of two screens for the theater shown in FIG. 1.

FIG. 2 shows a top plan view of the wide screen 14 and the first-run screen 26 when screen images are being displayed on the first-run screen 26 (e.g., when the theater 10 is showing 35 mm or 70 mm motion pictures). As evident in FIG. 2, the radius of the first-run screen 26 is greater than the radius of the wide screen 14. For instance, the first-run screen 26 can have a radius of approximately 79 feet, and the wide screen 14 can have a radius of 33–35 feet. These radial dimensions are designed to take into account the formats of the films being shown by the theater 10 as well as the dimensions of the theater itself and the physical location of the projection components, such as the projectors (e.g., the projectors 38–42) and the screens (e.g., the wide screen 14 and the first-run screen 26). Furthermore, although the term "wide-screen" is used herein to identify the screen 14, it is understood that this term is relative and relates to motion picture film format and not necessarily to physical dimensions of the screens 14 and 26.

In FIG. 2, the curtain 36 (shown in broken lines) of the first-run screen 26 is positionable in front of the first-run screen 26. The wide screen 14 can have its curtain 22 (also shown in broken lines) positioned in front of the wide screen 14. However, the ceiling track 24 can be designed such that only a single curtain is used. Separate tracks can be provided for each screen curtain 22 and 36, with appropriate track switching elements in the ceiling track 24 to allow a single curtain to be used for both screens, in a manner analogous to switching railroad tracks.

The first-run screen 26 has its screen sheeting 30 stretched across its arcuate surface as shown in FIG. 2. The screen sheeting 30 is attached to the frame 28 by a series of hooks or pins (not shown) arranged along the rectangular perimeter of the first-run screen 26 formed by the frame 28. The frame 28 supporting the first-run screen 26 is broken up into individual frame sections 28a–i. Each of the individual frame sections 28a–i is in turn mounted on respective wheeled platforms 34 (see, e.g., FIG. 1). A plurality of sound speakers 32a–g are mounted to respective frame sections 28b–h.

The first-run screen 26 has on its left side, a pair of acoustic panels 44 and 46 that swing outwardly to be flush with the arcuate surface of the first-run screen 26, and can fold inwardly when the first-run screen 26 is being dismantled or moved. There are similar acoustic panels 48 and 50 on the right side of the first-run screen 26. All of the frame sections 28a–i are positioned tightly together to form a substantially continuous and flush arcuate surface on which the screen sheeting 30 can be stretched. The frame sections 28a–i can be simply pushed tightly together, or mechanical couplers or ropes can be used to secure the individual frame sections 28a–i together. For added stability, support dollies 52, 54, and 56 are provided at the left, center, and right regions, respectively, of the base of the first-run screen 26.

The wide screen 14 is shown in FIG. 2 having a moveable left panel section 58 and a right panel section 60 positioned in front of a fixed central section 70. When the wide screen 14 is operational, as will be described below with reference to FIG. 6, the side panel sections 58 and 60 slide outwardly along tracks (not shown) located at the base and/or at the edges of the wide screen 14, thereby extending and completing the arcuate surface for the wide screen 14. As with the first-run screen 26, the wide screen 14 can be provided with its frame 18 in sections, or the frame 18 can be a single structure. In an exemplary embodiment, the fixed portions of the frame 18 corresponding to the central section 70 are constructed with steel pipes for strength and rigidity, while the moveable frame portion supporting the side panel sections 58 and 60 are constructed with aluminum for lighter weight.

Although the side panel sections 58 and 60 are described herein as sliding along tracks, it is to be appreciated that the side panel sections 58 and 60 can also be mounted on wheeled frames that are rolled outwardly, or the panel sections 58 and 60 can have wheels attached to their base. Also, it is possible to provide embodiments where the panel sections 58 and 60 are folding panels that swing outwardly about a pivot point, similar to a door swinging on a hinge, instead of sliding or rolling along tracks. Additionally, although the central section 70 is fixed in the embodiment shown in FIG. 2, it is also to be appreciated that both the wide screen 14 and the first-run screen 26 can be mounted on wheeled platforms 34 or tracks such that all sections of both screens are mobile and movable relative to each other.

Figure 3:
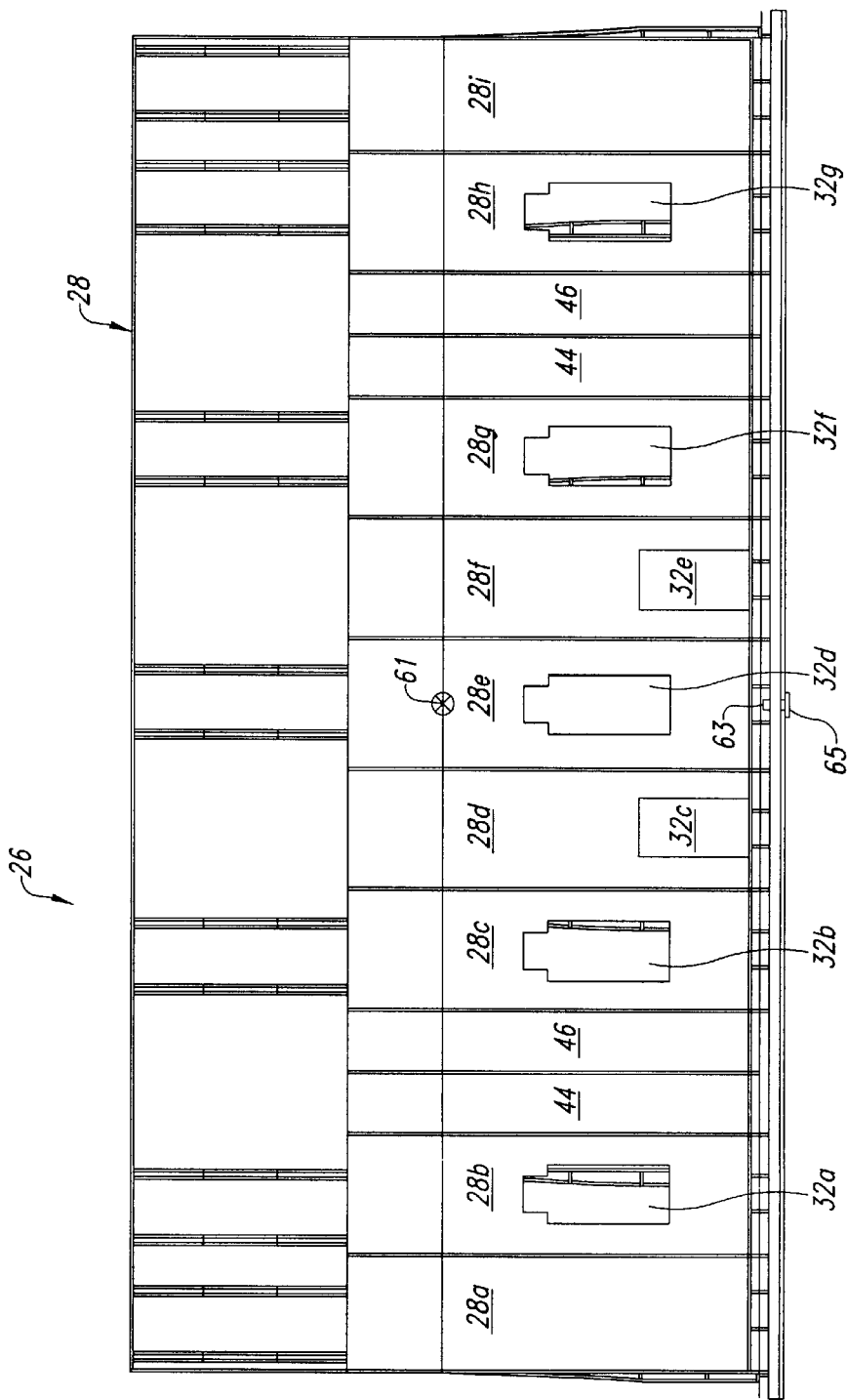
FIG. 3 is a front elevational view of frame sections for one of the screens shown in FIG. 2.

FIG. 3 illustrates a front elevational view of the frame sections 28a–i of the frame 28 for first-run screen 26, with the screen sheeting 30 removed. A central location on which the screen images are focused is indicated at 61. An alignment pin 63 extends through the frame section 28e into a mating alignment receptacle 65 in the floor of the theater 10 to assure proper alignment of the frame 28. Thereafter, the remaining frame sections 28a–d and 28f–i are aligned relative to the frame section 28e. Alternatively, the frame sections 28a–d and 28f–i can also be provided with alignment pins and corresponding alignment receptacles.

The frame sections 28a–i are positioned tightly against each other, with the left acoustic panels 44 and 46 and the right acoustic panels 48 and 50 folded outwardly as shown. Front panels mounted to the frame sections 28b–h function as speaker baffles (see, e.g., the speaker baffle 68 in FIG. 5) or acoustic panels for respective speakers 32a–g. In the arrangement shown in FIG. 3, the speakers 32a, 32b, 32f, and 32g are left, left center, right center, and right speakers, respectively. The speaker 32d is a center speaker. The speakers 32c and 32e are sub-bass speakers.

Figures 4, 5:
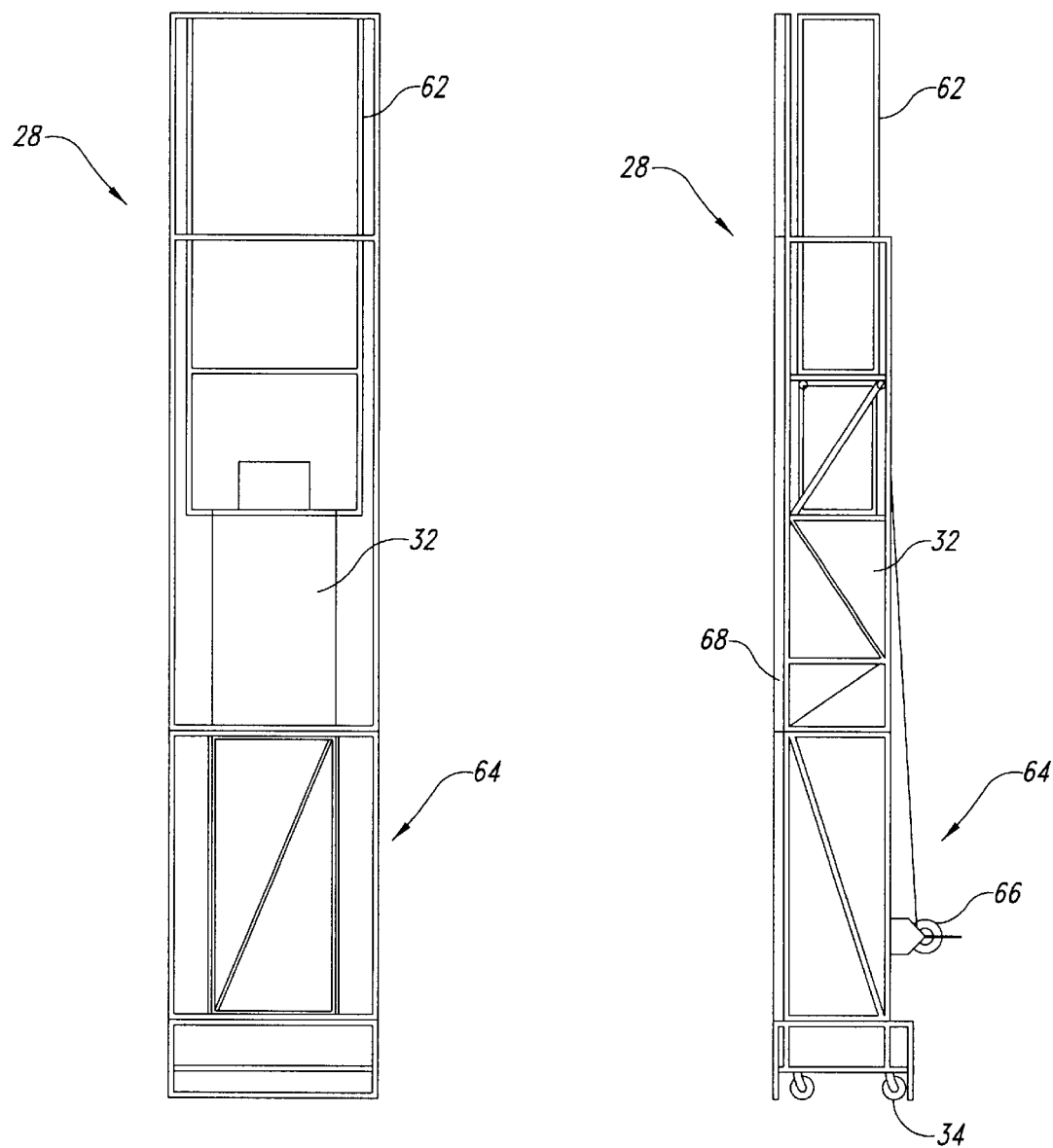
FIG. 4 is a front elevational view of a single frame section of one of the frame sections shown in FIG. 3.
FIG. 5 is a side elevational view of the single frame section shown in FIG. 4.

FIGS. 4 and 5 show two different views of one of the frame sections 28a–i in more detail, with the view in FIG. 5 showing the speaker baffle 68 mounted to the frame section. An appropriate speaker 32, such as one of the speakers 32a, 32b, 32d, 32f, or 32g (see, e.g., FIGS. 2 and 3), is mountable in a middle region of the frame section, as shown. An upper portion 62 of the frame section (e.g., the frame section 28a) can be lowered towards a lower position 64 when the frame section is being stored or moved. When the upper portion 62 is lowered, the speaker 32 can also be moved to the lower position 64 for storage. A pulley arrangement 66 allows the upper portion 62 to be easily raised or lowered.

Figure 6:
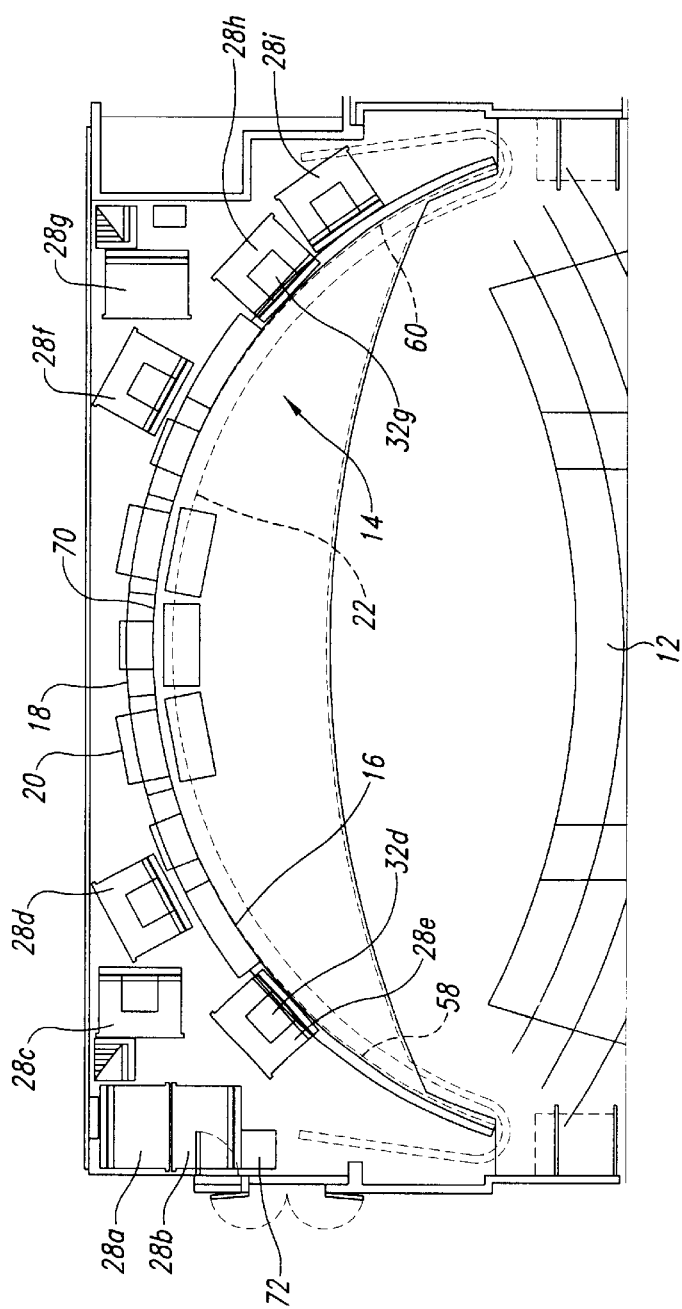
FIG. 6 is a top plan view of one of the screens shown in FIG. 2 after the other screen has been moved.

FIG. 6 shows a top plan view of the wide screen 14 when it is operational and with the first-run screen 26 removed. First, the screen sheeting 30 for the first-run screen 26 is removed by unhooking it from the frame 28, and rolling the screen sheeting 30 into a tight roll onto a vertical shaft (not shown) affixed to a storage cube 72 (see, e.g., FIG. 2) initially positioned at the left edge of the first-run screen 26. The frame sections 28a–i of the first-run screen 26 are then disconnected from one another, and moved to the rear locations shown in FIG. 6 by using the wheeled platform 34 at the base of each frame section 28a–i. Like the frame sections 28a–i, the storage cube 72 can be wheeled away and stored to the rear of the wide screen 14.

The side panel sections 58 and 60 of the wide screen 14 are subsequently extended outwardly from the fixed central section 70 to lengthen and complete its arcuate surface, as shown in FIG. 6. To the extent that there may be gaps between the sections of the wide-screen 14 after the side panel sections 58 and 60 are extended outwardly, the sections can be positioned tightly together to minimize any gaps, or the adjoining edges of the screen sections can be provided with overlapping flanges so that a substantially continuous arcuate surface results.

In the embodiment shown in FIG. 6, the screen sheeting 16 of the wide screen 14 is then stretched across and mounted to the central section 70 and to the side panel sections 58 and 60. Further, the speakers 32d and 32g of the frame sections 28e and 28h, respectively, of the first-run screen 26 can be used to supplement the sound system for the wide screen 14 by positioning these speakers 32d and 32g behind the side panel sections 58 and 60. It is possible to use any of the speakers 32a–g to supplement the sound system for the wide screen 14. When the theater 10 returns to showing 35 mm or 70 mm films, the process described above is simply reversed to rebuild the first-run screen 26.

Although the embodiment of the wide screen 14 shown in FIG. 6 uses the screen sheeting 16 stretched across its arcuate surface, it is to be appreciated that the screen surface of the central section 70 and of the side panels 58 and 60 can be made of a non-pliant screen surface material, such as wood, instead of a flexible material that can be rolled and unrolled. In other alternative embodiments, the wide screen 14 can use a combination of both pliant and non-pliant screen surface materials for its individual sections 58, 60, and 70. Similarly, combinations of pliant and non-pliant screen surface materials or sheeting can be used for the frame sections 28a–i of the first-run screen 26.

Further, although different screen sections mentioned above are described as being movable by using either wheeled platforms 34 or tracks, it is to be appreciated that some embodiments of the invention may utilize only tracks, only wheeled platforms 34, or any combination of wheeled platforms 34 and tracks to provide mobility for the screen sections. Alternative embodiments can also provide a dual-screen system mounted on rotating turntables or rotating stage floors. In addition, although the embodiments described herein provide the first-run screen 26 with complete mobility and at least a section of the wide screen 14 being fixed, it is possible to have other arrangements. For example both screens 14 and 26 can be completely mobile if both screens are mounted on wheeled platforms 34. It is also possible to provide movable projectors 38, 40, and 42 that project screen images on movable or fixed screens 14 and 26.

Although the embodiments described herein show the wide screen 14 positioned behind the first-run screen 26, it is possible to provide embodiments where the positions of the two screens 14 and 26 are switched. That is, the wide screen 14 can be positioned between the projectors 38, 40, 42 and the first-run screen 26.

Therefore, the above description of illustrated embodiments of the invention is not intended to be exhaustive or to limit the invention to the precise forms disclosed. While specific embodiments of, and examples for, the invention are described herein for illustrative purposes, various equivalent modifications including those described above are possible within the scope of the invention, as those skilled in the relevant art will recognize. The teachings provided herein of the invention can be applied to other screen systems, not necessarily the illustrative dual-screen theater described above. The various embodiments above can be combined to provide further embodiments. In general, in the following claims, the terms used should not be construed to limit the invention to the specific embodiments disclosed in the specification and the claims, but should be construed to include all theaters or screen systems that operate under the claims to provide first and second screens, with one screen movable relative to the other screen. Accordingly, the invention is not limited by the disclosure, but instead the scope of the invention is to be determined entirely by the following claims, which are to be construed in accordance with established doctrines of claim interpretation.

What is claimed is:

1. A theater, comprising:
    a first screen having a central portion and moveable left and right side panel portions, the left and right side panel portions having an operating position and a storage position, the first screen having a first radius to display screen images having a first format;
    a second screen having a second radius different from the first radius to display screen images having a second format and being movable relative to the first screen to replace the first screen, the left and right side panel portions interfering with the second screen when in the operating position and being moved to the storage position when the second screen replaces the first screen; and a projection system disposed in front of a selected one of the first and second screens and operable to display screen images either on the first screen only or on the second screen only.

2. The theater of claim 1 wherein the second screen is positionable between the first screen and the projection system to allow the projection system to display the screen images on the second screen instead of on the first screen.

3. The theater of claim 1, further comprising a frame having a plurality of frame sections positioned adjacent each other, the second screen being mounted to adjacent ones of the frame sections.

4. The theater of claim 1, further comprising a frame having a plurality of frame sections affixed to a corresponding rotating member, the second screen being mounted to adjacent ones of the frame sections, the rotating member operable to rotate to move a corresponding frame section relative to the first screen.

5. The theater of claim 1 wherein the projection system is operable to project a plurality of screen images on to a corresponding plurality of adjacent regions of one of the first and second screens.

6. The theater of claim 1, further comprising a sound system.

7. The theater of claim 1, further comprising a sound system having a plurality of speakers mountable to a frame coupled to one of the screens.

8. A screen system, comprising:
    a first screen having a center portion and moveable left and right side panels, the left and right side panels having an operating position and a storage position, the first screen having a first radius; and
    a second screen having a second radius different from the first radius, the system operable to display screen images on the first screen only or on the second screen only when a position of one screen is moved relative to a position of the other screen wherein only the first screen or the second screen is positioned to display screen images, the left and right side panels interfering with the second screen when in the operating position and being moved to the storage position when the second screen is positioned to display screen images.

9. The screen system of claim 8 wherein the second screen is positionable in front of the first screen to allow the screen images to be displayed on the second screen instead of on the first screen.

10. The screen system of claim 8, further comprising a frame having a plurality of frame sections, the second screen being mounted to adjacent ones of the frame sections.

11. The screen system of claim 8, further comprising a frame having a plurality of frame sections attached to a corresponding rotating member, the second screen being mounted to adjacent ones of the frame sections, the rotating member operable to rotate to move a corresponding frame section relative to the first screen.

12. The screen system of claim 8 wherein one of the screens includes a plurality of adjacent screen regions oriented to display a corresponding plurality of screen images projected from different directions.

13. The screen system of claim 8, further comprising a sound system.

14. The screen system of claim 8, further comprising a sound system having a plurality of speakers mountable to a frame coupled to one of the screens.

15. A method of displaying screen images, the method comprising:
    providing a first screen having a central screen portion and left and right side panel portions, the left and right side panels having an operating position and a storage position, the first screen having a first radius;
    providing a second screen having a second radius different from the first radius;
    moving one of the screens relative to the other screen to position a selected one of the first and second screens to receive screen images, the left and right side panel portions interfering with the second screen when in the operating position and being moved to the storage position when the second screen is positioned to receive screen images; and
    projecting the screen images on either the first screen only or on the second screen only.

16. The method of claim 15, further comprising positioning the second screen in front of the first screen and wherein moving one of the screens relative to the other screen includes:
    mounting the second screen on to adjacent sections of a frame; and
    moving the sections of the frame away from the first screen if the screen images are projected on the first screen.

17. The method of claim 15, further comprising producing sound from a sound system mounted to a frame of one of the screens.

18. The method of claim 15 wherein projecting the screen images includes:
    displaying screen images having a first format on the first screen; and
    displaying screen images having a second format different from the first format on the second screen.

* * * * *